United States Patent
Vincent et al.

(10) Patent No.: US 9,706,401 B2
(45) Date of Patent: Jul. 11, 2017

(54) USER-AUTHENTICATION-BASED APPROVAL OF A FIRST DEVICE VIA COMMUNICATION WITH A SECOND DEVICE

(71) Applicant: Microsoft Technology Licensing, LLC, Redmond, WA (US)

(72) Inventors: Benjamin R. Vincent, Kirkland, WA (US); Tarek B. Kamel, Issaquah, WA (US); Sparky Toews, Seattle, WA (US); Dejan Subotic, Kirkland, WA (US); Peter E. Zenzerovich, Kenmore, WA (US); James Shang Kai Chou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/553,708

(22) Filed: Nov. 25, 2014

(65) Prior Publication Data

US 2016/0150406 A1    May 26, 2016

(51) Int. Cl.
*G06F 21/00* (2013.01)
*G06F 21/34* (2013.01)
(Continued)

(52) U.S. Cl.
CPC ............ *H04W 12/06* (2013.01); *G06F 21/34* (2013.01); *H04L 9/0869* (2013.01);
(Continued)

(58) Field of Classification Search
CPC ..... H04L 9/321; H04L 9/3215; H04L 9/3234; H04L 9/3271; H04L 63/08;
(Continued)

(56) References Cited

U.S. PATENT DOCUMENTS

| | | | |
|---|---|---|---|
| 2007/0186105 A1* | 8/2007 | Bailey | ................. H04L 63/0492 713/168 |
| 2009/0063850 A1* | 3/2009 | Joram | ..................... G06F 21/40 713/155 |

(Continued)

FOREIGN PATENT DOCUMENTS

| | | |
|---|---|---|
| EP | 1566938 A1 | 8/2005 |
| EP | 2600319 A1 | 6/2013 |

(Continued)

OTHER PUBLICATIONS

Roalter, et al., "Visual Authentication—A Secure Single Step Authentication for User Authorization", In Proceedings of 12th International Conference on Mobile and Ubiquitous Multimedia, Dec. 2, 2013, 4 pages.

(Continued)

*Primary Examiner* — Joseph P Hirl
*Assistant Examiner* — Kalish Bell
(74) *Attorney, Agent, or Firm* — Fiala & Weaver P.L.L.C.

(57) ABSTRACT

User-authentication-based approval of a first device via communication with a second device over a channel (e.g., an insecure channel) is described. The first device receives a session ID and first user-observable information, or an identifier thereof, from an identity provider, presents the first user-observable information to a user, and sends the session ID to the second device. The second device sends the session ID to the identity provider to obtain therefrom second user-observable information, or an identifier thereof, and a security challenge. The second user-observable information bears a user-discernable relationship to the first user-observable information and is presented to the user by the second device. The second device is capable of generating a response to the security challenge for transmission to the identity provider based at least on input received from the (Continued)

user, the response to the security challenge being indicative of the suitability of the first device for approval.

20 Claims, 9 Drawing Sheets

(51) Int. Cl.
*H04W 12/06* (2009.01)
*H04L 9/08* (2006.01)
*H04L 29/06* (2006.01)

(52) U.S. Cl.
CPC .......... *H04L 63/0853* (2013.01); *H04L 63/18* (2013.01); *H04L 2209/24* (2013.01)

(58) Field of Classification Search
CPC ..... H04L 63/0853; G06F 21/00; G06F 21/34; G06F 2221/2153
USPC .............................................. 726/2–4, 16, 17
See application file for complete search history.

(56) References Cited

U.S. PATENT DOCUMENTS

| | | | | |
|---|---|---|---|---|
| 2009/0119754 | A1* | 5/2009 | Schubert | ............ H04L 63/0853 726/4 |
| 2011/0219427 | A1 | 9/2011 | Hito et al. | |
| 2012/0198531 | A1 | 8/2012 | Ort et al. | |
| 2013/0189925 | A1* | 7/2013 | Staskawicz | ............ H04B 7/24 455/41.1 |
| 2013/0219479 | A1* | 8/2013 | DeSoto | ................. H04W 12/06 726/6 |
| 2014/0006784 | A1 | 1/2014 | Walker et al. | |
| 2014/0109204 | A1* | 4/2014 | Papillon | ................ H04L 9/3215 726/5 |
| 2014/0181911 | A1 | 6/2014 | Kula | |
| 2014/0181929 | A1 | 6/2014 | Zheng et al. | |
| 2014/0185808 | A1* | 7/2014 | Movassaghi | .............. H04L 9/32 380/278 |
| 2014/0282923 | A1 | 9/2014 | Narayan et al. | |

FOREIGN PATENT DOCUMENTS

| | | |
|---|---|---|
| WO | 2013151854 A1 | 10/2013 |
| WO | 2014016619 A1 | 1/2014 |
| WO | 2014185865 A1 | 11/2014 |

OTHER PUBLICATIONS

"International Search Report Issued in PCT Application No. PCT/US2015/060778", Mailed Date: Feb. 15, 2016, 12 Pages.

Chong, et al., "A Survey of User Interaction for Spontaneous Device Association", In ACM Computing Surveys vol. 47, Issue 1, Article 8, Apr. 2014, 40 Pages.

"Second Written Opinion Issued in PCT Application No. PCT/US2015/060778", Mailed Date: Oct. 6, 2016, 7 Pages.

"International Preliminary Report on Patentability Issued in PCT Application No. PCT/US2015/060778", Mailed Date: Feb. 15, 2017, 7 Pages.

\* cited by examiner

USER-AUTHENTICATION-BASED APPROVAL OF A FIRST DEVICE VIA COMMUNICATION WITH A SECOND DEVICE

BACKGROUND

The term "user authentication" may refer to a process by which the identity of a user is confirmed prior to providing the user, or a device associated with the user, with access to one or more resources. For example, one common method for authenticating a user before providing services in association with a particular account is to require the user to input a password that has been associated with the account by the owner thereof. The user may also be required to provide an identifier (ID) of the account itself (sometimes called the "user ID"). Since, in theory, only the owner of the account knows both the user ID and the password, the providing of these credentials may be deemed sufficient to authenticate the user.

When user authentication is performed via the Internet, a user is often required to enter such credentials into a graphical user interface (GUI) of a Web browser or other application running on an Internet-enabled device. The GUI is typically rendered to a rich display associated with the device (e.g., a monitor connected to a computer, a display of a laptop computer or smart phone, a television connected to a gaming console, etc.). The user may enter the credentials using an input device such as a keyboard, touchscreen, game controller, or the like, depending on the device being used to perform user authentication.

Wearable computing devices with wireless networking capabilities are now becoming more and more prevalent. These devices include, for example, head-mounted computing devices such as Google's GLASS™, smart watches such as Apple's APPLE WATCH™, and personal fitness devices such as Microsoft's MICROSOFT BAND™ and Fitbit's FITBIT® activity tracking devices. It may be deemed necessary or desirable to authenticate a user to ensure that he or she is the actual owner of a particular wearable device before providing the wearable device with access to resources on behalf of the user. However, due to their small form factors, many wearable computing devices have very limited user interfaces, both in terms of display capabilities and user input capabilities. For this reason, it can be difficult or even impossible to conduct user authentication via these devices using traditional methods such as that described above, in which user credentials are entered into a GUI rendered to a rich display. A similar issue may arise with respect to embedded computing devices, such as those used to implement the Internet of Things (IoT). Many of these embedded computing devices do not include the rich display and/or user input capabilities necessary to enable a user to enter user credentials in the aforementioned manner.

In some scenarios, a user may own a device that can act as a credential of the user for the purposes of user authentication. For example, the device may be configured to automatically receive and respond to a security challenge on behalf of the user. In such a scenario, the user may not have a password or other user-input-based credential since the device satisfies the need for a credential. If this is the case, there may be no way for the user to authenticate another device via which the user wishes to obtain access to resources.

SUMMARY

Systems, methods and computer program products are described herein that facilitate user-authentication-based approval of a first device via communication with a second device. In accordance with embodiments, the first device receives a session ID and first user-observable information, or an identifier thereof, from an identity provider. The first device presents the first user-observable information to a user. The first device also sends the session ID to the second device over a channel, which may comprise an insecure channel. The second device sends the session ID to the identity provider to obtain therefrom second user-observable information, or an identifier thereof, and a security challenge. The second user-observable information bears a user-discernable relationship to the first user-observable information and is presented to the user by the second device. The second device is further capable of generating a response to the security challenge for transmission to the identity provider based at least on input received from the user by the second device. The response to the security challenge is indicative of the suitability of the first device for user-authentication-based approval by the identity provider.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
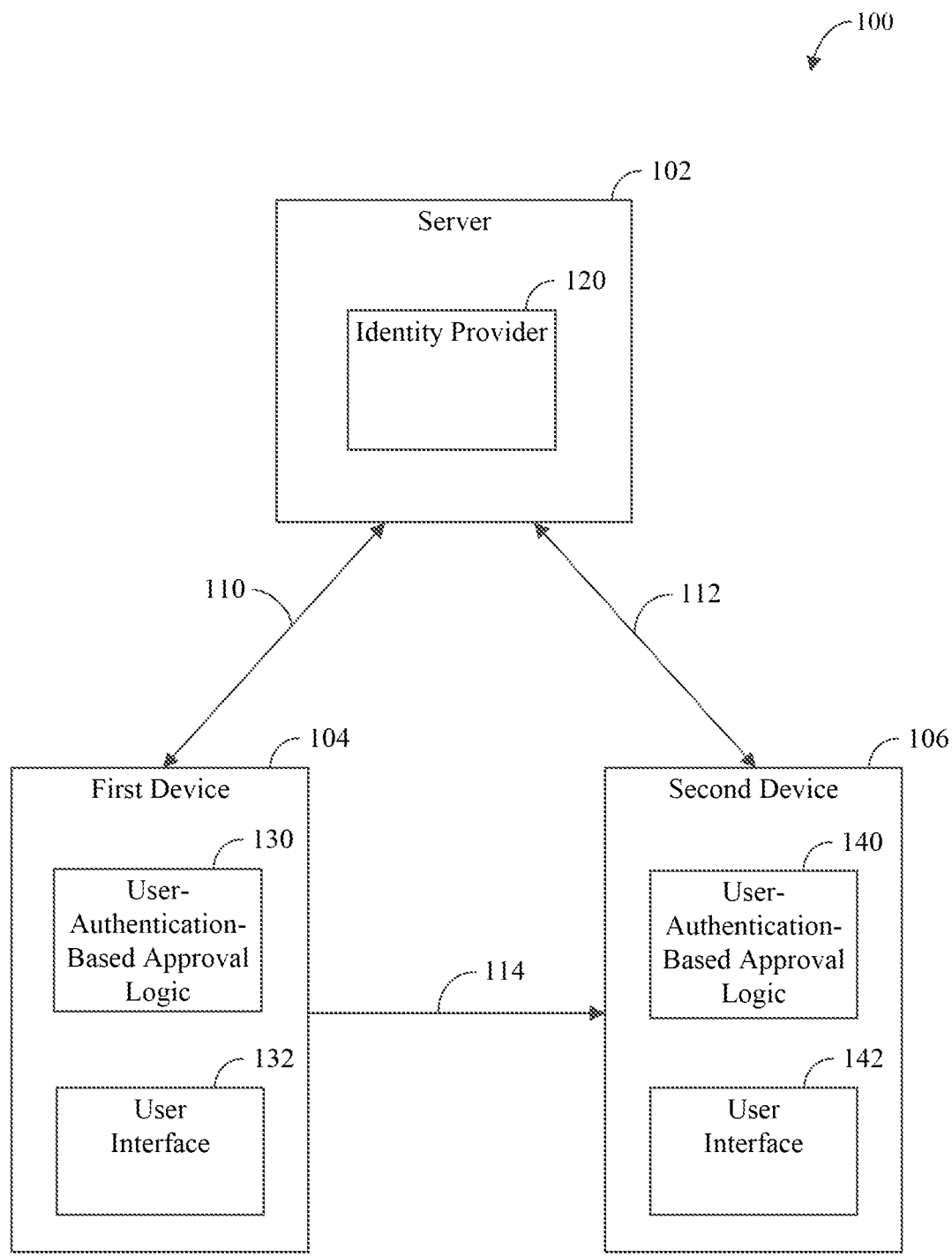
FIG. 1 is a block diagram of a system that facilitates user-authentication-based approval of a first device via communication with a second device in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems, methods and computer program products are described herein that facilitate user-authentication-based approval of a first device via communication with a second device. In accordance with embodiments, the first device receives a session ID and first user-observable information, or an identifier thereof, from an identity provider. The first device presents the first user-observable information to a user. The first device also sends the session ID to the second device over a channel, which may comprise an insecure channel. The second device sends the session ID to the identity provider to obtain therefrom second user-observable information, or an identifier thereof, and a security challenge. The second user-observable information bears a user-discernable relationship to the first user-observable information and is presented to the user by the second device. The second device is further capable of generating a response to the security challenge for transmission to the identity provider based at least on input received from the user by the second device. The response to the security challenge is indicative of the suitability of the first device for user-authentication-based approval by the identity provider.

In accordance with the foregoing technique, if the second device can provide a valid response to the security challenge to the identity provider, then the identity provider can determine that the user of the second device is one for whom resources should be made accessible via the first device. Furthermore, in embodiments, since the user can compare the first user-observable information presented by the first device to the second user-observable information presented by the second device and determine whether a valid relationship exists between the two (e.g., in some embodiments, by seeing if the information is the same), the user can control whether or not the second device will provide a response to the security challenge that will cause the first device to be approved. For example, if the user does not see that a valid relationship exists between the first user-observable information presented by the first device and the second user-observable information presented by the second device, then the user may determine that some device associated with another user (e.g., a malicious user) is seeking approval to access the user's resources. In such a case, the user can decide not to provide a response to the security challenge via the second device.

In accordance with certain embodiments, the foregoing technique enables the first device to be approved in a manner that does not require the user to input any information (e.g., user credentials) into the first device. Furthermore, to implement certain embodiments, the first device need only include a user interface that is capable of presenting the first user-observable information. As will be discussed herein, the first user-observable information may be an image, a word, an alphanumeric code, a sound, or other information that can be presented by the first device without requiring the use of a rich display. Thus, the foregoing technique provides a technical solution to the problem of obtaining user-authentication-based approval of devices that have limited display and/or user input capabilities, such as some wearable computing devices and embedded computing devices. As was noted in the Background Section above, it can be difficult or even impossible to conduct user authentication via such devices when trying to employ traditional methods that require entering user credentials into a GUI rendered to a rich display.

In accordance with further embodiments, the foregoing technique also enables the first device to be approved by leveraging a second device that is configured to act as a credential for a user for the purposes of user authentication. As was noted in the Background Section above, when the second device is configured to act as the credential for the user, the user may not have a password since the second device satisfies the need for a credential. In such a case, being able to utilize the second device to facilitate user-authentication-based approval of the first device in the manner described herein solves the technical problem of obtaining user-authentication-based approval of the first device when the user does not have a password or other user-input-based credential.

In the following sections, embodiments of the aforementioned systems, methods and computer program products will be more fully described. In particular, Section II describes a system that facilitates user-authentication-based approval of a first device via communication with a second device. Section III describes an example mobile device that may be used to implement the system described in Section II. Section IV describes an example processor-based computer system that may be used to implement the system described in Section II. Section V describes some additional exemplary embodiments. Section VI provides some concluding remarks.

II. Example System that Facilitates User-Authentication-Based Approval of a First Device Via Communication with a Second Device FIG. 1 is a block diagram of an example system 100 that facilitates user-authentication-based approval of a first device via communication with a second device in accordance with an embodiment. As shown in FIG. 1, system 100 includes a server 102, a first device 104, and a second device 106.

Server 102 is intended to represent a processor-based computing device that is operable to provide services to other computing devices that can connect thereto via one or more networks. One example of a processor-based computing device that may be used to implement server 102 is described below in reference to FIG. 10. However, that example is not intended to be limiting and a wide variety of other server implementations may be used.

As shown in FIG. 1, server 102 includes an identity provider 120. In one embodiment, identity provider 120 comprises software that is executed by one or more processors of server 102. However, this example is not intended to be limiting, and it is possible that one or more features or functions of identity provider 120 may be implemented in hardware (e.g., using digital and/or analog circuits) or as a combination of software executed by a processor and hardware. Furthermore, although identity provider 120 is shown as part of server 102, it is possible that identity provider 120 may be implemented by multiple servers using distributed computing techniques or the like.

Generally speaking, identity provider 120 is configured to create, maintain and manage identity information for various users and to leverage such identity information to provide user authentication services to various clients that may connect to identity provider 120 via a network, such as the Internet. For example, identity provider 120 may be configured to receive one or more credentials from a client, authenticate a user of the client based on the credential(s), and then send a security token to the client that indicates that the user has been authenticated. This security token can then be used by the client to access resources on behalf of the user (e.g., to access services provided by a service provider on behalf of the user).

As will be discussed herein, identity provider 120 is further configured to carry out a protocol that enables a first device, such as first device 104, to receive user-authentication-based approval from identity provider 120 (e.g., to receive a security token from identity provider 120) in a manner that involves communication with a second device, such as second device 106.

First device 104 may comprise any type of device that is capable of accessing resources over a network on behalf of a user and that includes some form of user interface for interacting with the user. In certain embodiments, the user interface of first device 104 provides only limited display and/or user input capabilities such that first device 104 cannot be used or cannot easily be used to participate in traditional user authentication protocols that rely on user input and/or a rich display, such as protocols that require a user to enter an account ID and password into a GUI. For example, first device 104 may comprise a wearable computing device or an embedded computing device that provides only limited display and/or user input capabilities. Examples of wearable computing devices that may implement the features of first device 104 include, but are not limited to, head-mounted computing devices such as Google's GLASS™, smart watches such as Apple's APPLE WATCH™, and personal fitness devices such as Microsoft's MICROSOFT BAND™ and Fitbit's FITBIT® activity tracking devices. Examples of embedded computing devices that may implement the features of first device 104 include, but are not limited to, embedded computing devices commonly found in consumer, cooking, industrial, automotive, medical, commercial and military applications an well as embedded computing devices used to implement the Internet of Things (IoT).

However, first device 104 is not necessarily a device that has limited display and/or user input capabilities. Rather, first device 104 may comprise any one of a wide variety of devices with networking capabilities and a user interface. For example first device 104 may comprise a personal computer, a laptop computer, a tablet, a netbook, a smart phone, a game console, a personal media player, a personal navigation assistant, or the like.

Second device 106 may also comprise any type of device that is capable of accessing resources over a network on behalf of a user and that includes some form of user interface for interacting with the user. In embodiments, first device 104 and second device 106 are accessible to the same user. In accordance with such embodiments, since the same user can access both first device 104 and second device 106, he or she may utilize second device 106 to obtain user-authentication-based approval of first device 104 in accordance with the techniques described herein, so that first device 104 can access services on his or her behalf.

Second device 106 may comprise any of the device types that were discussed above in reference to first device 104. In certain embodiments, second device 106 has a user interface that provides more extensive display and/or user input capabilities than the user interface of first device 104. For example, second device 106 may have a user interface that can be used or can easily be used to participate in traditional user authentication protocols that rely on user input and/or a rich display, such as protocols that require a user to enter an account ID and password into a GUI, while first device 104 may not have such a user interface.

As shown in FIG. 1, first device 104 includes user-authentication-based approval logic 130 and a user interface 132. In one embodiment, user-authentication-based approval logic 130 comprises software that is executed by one or more processors of first device 104. However, this example is not intended to be limiting, and it is possible that one or more features or functions of user-authentication-based approval logic 130 may be implemented in hardware (e.g., using digital and/or analog circuits) or as a combination of software executed by a processor and hardware.

User-authentication-based approval logic 130 is configured to perform operations that facilitate obtaining user-authentication-based approval from identity provider 120 by first device 104 so that first device 104 can obtain access to resources on behalf of a user. These operations will be described in more detail herein. These operations involve communication between user-authentication-based approval logic 130 of first device 104 and identity provider 120 of server 102 over a communication channel 110 as well as communication between user-authentication-based approval logic 130 of first device 104 and user-authentication-based approval logic 140 of second device 106 over a communication channel 114.

User interface 132 comprises at least one means for outputting information to a user. Such means may include, for example and without limitation, a display, one or more audio speakers, one or more light emitting diodes (LEDs), piezoelectric haptic actuators or other haptic output devices, and/or any other mechanism for outputting information to a user. User interface 132 may also include a means for inputting information by a user, although such means need not be used to implement the techniques described herein. Such means may include, for example and without limitation, a keyboard, a keypad, a mouse, a touch screen, a touch pad, a trackball, a joystick, a pointing stick, a wired glove, a motion tracking sensor, a game controller or gamepad, a video capture device such as a camera, and/or any other mechanism for inputting information by a user.

As further shown in FIG. 1, second device 106 includes user-authentication-based approval logic 140 and a user interface 142. In one embodiment, user-authentication-based approval logic 140 comprises software that is executed by one or more processors of second device 106. However, this example is not intended to be limiting, and it is possible that one or more features or functions of user-authentication-based approval logic 140 may be implemented in hardware (e.g., using digital and/or analog circuits) or as a combination of software executed by a processor and hardware.

User-authentication-based approval logic 140 is configured to perform operations that facilitate the obtaining of user-authentication-based approval from identity provider 120 by first device 104 so that first device 104 can obtain access to resources on behalf of a user. These operations will be described in more detail herein. These operations involve communication between user-authentication-based approval logic 140 of second device 106 and user-authentication-based approval logic 130 of first device 104 over communication channel 114 as well as communication between user-authentication-based approval logic 140 of second device 106 and identity provider 120 of server 102 over a communication channel 112.

User interface 142 comprises at least one means for outputting information to a user. Such means may include, for example and without limitation, a display, one or more audio speakers, one or more LEDs, one or more piezoelectric haptic actuators or other haptic output devices, and/or any other mechanism for outputting information to a user. User interface 142 also includes at least one means for inputting information by a user. Such means may include, for example and without limitation, a keyboard, a keypad, a mouse, a touch screen, a touch pad, a trackball, a joystick, a pointing stick, a wired glove, a motion tracking sensor, a game controller or gamepad, a video capture device such as a camera, and/or any other mechanism for inputting information by a user.

Each of communication channel 110 between first device 104 and server 102 and communication channel 112 between second device 106 and server 102 may comprise a communication channel that is established over one or more networks. Such networks may include but are not limited a wide area network such as the Internet, a local area network, a private network, a public network, a packet network, a circuit-switched network, a wired network, and/or a wireless network. In an embodiment, one or both of communication channel 110 and communication channel 112 comprises a secure communication channel that is implemented using one or more cryptographic protocols.

In an embodiment, communication channel 114 between first device 104 and second device 106 is implemented over an insecure channel. That is to say, communication channel 114 between first device 104 and second device 106 may not be protected by any cryptographic protocols. However, it is also possible that the techniques described herein may be carried out in embodiments in which communication channel 114 comprises a secure channel.

In an embodiment, first device 104 and second device 106 are proximally located, such that they are both simultaneously accessible to the same user. In accordance with such an embodiment, communication channel 114 may be implemented using any of a wide variety of point-to-point or network based technologies or protocols for establishing communication between two proximally-located devices. For example, communication channel 114 may be implemented over a local area network, an IEEE 802.11 ("WiFi") network, a WiFi Direct connection, a BLUETOOTH® piconet, a Near Field Communication (NFC) session, a home phone line network, a home power line network, a wired serial connections (e.g., a USB connection), a wireless serial connections (e.g., a wireless USB connection), an infrared connection (e.g., an IrDA connection), a ZigBee network, a Z-Wave network, or a body area network.

However, communication channel 114 need not be implemented between two proximally-located devices to implement the techniques described herein. Furthermore, communication channel 114 may be implemented using technologies or protocols other than or in addition to those described above. For example, communication channel 114 may be implemented over a wide area network such as the Internet, over a telecommunications network, or the like.

The manner in which first device 104, second device 106 and server 102 interact to obtain user-authentication-based approval of first device 104 in accordance with one or more embodiments will now be described in reference to sequence diagram 200 of FIG. 2. In particular, sequence diagram 200 illustrates a sequence of communications that are carried out between user-authentication-based approval logic 130 of first device 104, user-authentication-based approval logic 140 of second device 106, and identity provider 120 of server 102 to obtain user-authentication-based approval of first device 104 in one or more embodiments.

Each communication shown in sequence diagram 200 may comprise a single message, multiple messages, or one or more bidirectional message exchanges between the respective sender and receiver of the communication. Persons skilled in the relevant art(s) will appreciate that the manner in which each communication is carried out may vary depending upon such factors as the particular communication protocols and media used to implement the various communication channels between first device 104, first device 106 and server 102.

Figure 2:
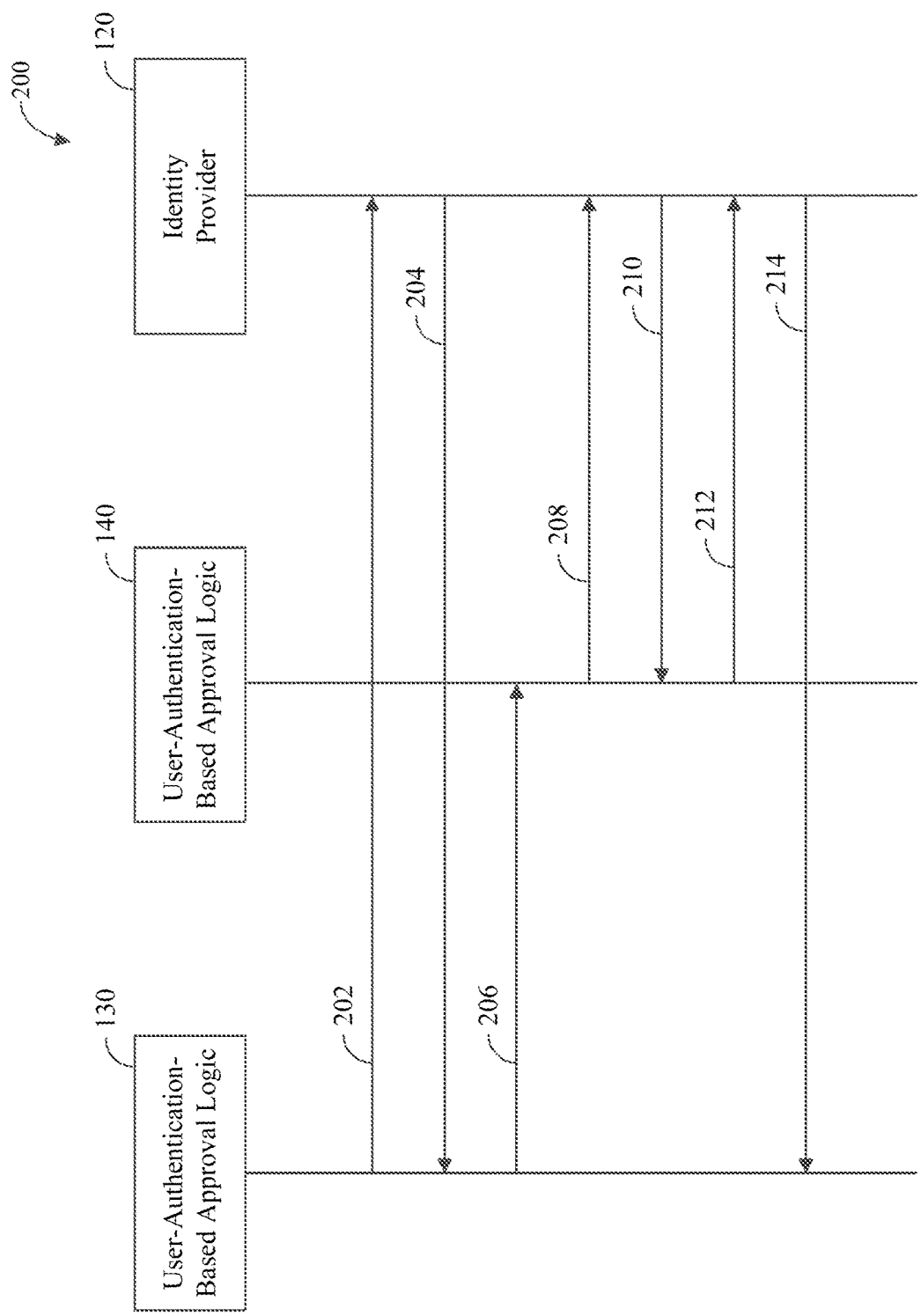
FIG. 2 is a diagram that shows a sequence of communications that are carried out between a first device, a second device and an identity provider to obtain user-authentication-based approval of the first device in accordance with an embodiment.

As shown in FIG. 2, the sequence of communications is initiated when user-authentication-based approval logic 130 of first device 104 sends a request 202 to identity provider 120 via communication channel 110. In an embodiment, first user-authentication-based approval logic 130 is configured to generate and transmit request 202 automatically in response to the occurrence of a predetermined event. For example, first user-authentication-based approval logic 130 may be configured to automatically generate and transmit request 202 in response to first device 104 being powered on for a first time. In another embodiment, first user-authentication-based approval logic 130 is configured to generate and transmit request 202 based at least on user input received via user interface 132 of first device 104 or an activity performed by a user via such user interface. For example, first user-authentication-based approval logic 130 may be configured to generate and transmit request 202 in response to a user interacting with user interface 132 to place first device 104 in a "setup" state, to activate or interact with a particular application or operating system of first device 104, to utilize first device 104 to access a remote service, or the like.

In response to receiving request 202, identity provider 120 sends a response 204 to user-authentication-based approval logic 130 of first device 104 via communication channel 110. Response 204 includes a session identifier (ID) and first user-observable information. The session ID may represent a session for which user-based-authentication approval is sought. In an embodiment, the session ID comprises a cryptographically secure random number or a cryptographically secure pseudorandom number that is generated by identity provider 120. The first user-observable information comprises information that is suitable for presentation to a user of first device 104 via user interface 132.

After first device 104 receives the first user-observable information, it presents the first user-observable information to the user via user interface 132. Depending upon the type of user interface implemented by first device 104, the first user-observable information may be presented in a viewable form (e.g., via a display of first device 104, via one or more LEDs of first device 104, or the like), in an audible form (e.g., via one or more audio speakers of first device 104), and/or in a touch-sensible form (e.g., via one or more haptic output devices of first device 104).

The first user-observable information may comprise, for example, an image. As another example, the first user-observable information may comprise a word. As yet another example, the first user-observable information may comprise an alphanumeric code. In further embodiments, the first user-observable information may comprise a particular blinking pattern of an LED, a particular sequence of sounds, or a particular pattern of touch-sensible sensations. A vast variety of other types of user-observable information may be used. The first user-observable information need only be information that can be recognized by a user to the extent necessary to determine whether the first user-observable information bears some relation to second user-observable information that will be displayed by second device 106 in a manner to be described below.

In the foregoing, it was stated that response 204 includes the first user-observable information. In an alternate embodiment, response 204 does not include the first user-observable information but instead includes an identifier thereof. In accordance with such an embodiment, first device 104 can use the identifier to identify a locally-stored version of the first user-observable information (e.g., a version of the first user-observable information that is stored in memory on first device 104), which first device 104 can then present to the user. It is possible that the identifier of the first user-observable information that is received by first device 104 can also be used by first device 104 to retrieve the first user-observable information from another source (e.g., from a remote device to which first device 104 may be communicatively connected).

After first user-authentication-based approval logic 130 of first device 104 receives response 204 from identity provider 120, it sends a communication 206 that includes the session ID to second user-authentication-based approval logic 140 of second device 106 via communication channel 114. As was previously noted, communication channel 114 may comprise an insecure channel.

After second user-authentication-based approval logic 140 of second device 106 receive communication 206, it extracts the session ID therefrom. Second user-authentication-based approval logic 140 then sends a communication 208 that includes the session ID to identity provider 120 via communication channel 112.

In response to receiving communication 208 (and the session ID included therein), identity provider 120 sends a communication 210 to second user-authentication-based approval logic 140 of second device 106 that includes second user-observable information and a security challenge. The second user-observable information comprises information that is suitable for presentation to a user of second device 106 via user interface 142. The second user-observable information also bears a user-discernable relationship to the first user-observable information that was presented to the user by first device 104.

After second device 106 receives the second user-observable-information, it presents the second user-observable information to the user via user interface 142. Depending upon the type of user interface implemented by second device 106, the second user-observable information may be presented in a viewable form (e.g., via a display of second device 106, via one or more LEDs of second device 106, or the like), in an audible form (e.g., via one or more audio speakers of second device 106), and/or in a touch-sensible form (e.g., via one or more haptic output devices of second device 106).

Like the first user-observable information that was presented to the user by first device 104, the second user-observable information may comprise an image, a word, an alphanumeric code, a particular blinking pattern of an LED, a particular sequence of sounds, a particular set of touch-sensible sensations, or any of a vast variety of other types of user-observable information. The second user-observable information that is presented by second device 106 need only be information that can be recognized by a user to the extent necessary to determine whether it bears some relation to the first user-observable information that was presented to the user by first device 104.

Non-limiting examples of user-discernable relationships between the first user-observable information and the second user-observable information will now be provided. In one embodiment, the first user-observable information is identical to the second user-observable information. For example, in accordance with such an embodiment, the first user-observable information may be an image of a tree and the second user-observable information may be an identical image of the tree. In another example, the first user-observable information may be the alphanumeric code X1J43BL7 and the second user-observable information may also the alphanumeric code X1J43BL7.

In another embodiment, the first user-observable information is a representation of information in one form while the second user-observable information is a representation of the same information in another form. For example, in accordance with such an embodiment, the first user-observable information may be the word "elephant" and the second user-observable information may be an image of an elephant. In another example, the first user-observable information may be a particular on/off pattern of an LED on first device 104 and the second user-observable information may be a graphical representation of the same on/off pattern on an image of an LED rendered to a display of second device 104.

In a further embodiment, the first user-observable information is a representation of a first object and the second user-observable information is a representation of a second object that bears a known relationship to the first object. For example, in accordance with such an embodiment, the first user-observable information may be the sound of the spoken word "salt" and the second user-observable information may be the written word "pepper." As another example, the first user-observable information may be the string "2+2" and the second user-observable information may be the number "4".

In a still further embodiment, the user-discernable relationship between the first user-observable information and the second user-observable information is a relationship that is defined in advance by a user. For example, a user may interact with IDP 120 at an earlier point in time to specify or select the first user-observable information and the second user-observable information, thereby creating a relationship there between that may only be known to that user. For example, the user may specify that the first user-observable information is an image of a tree and the second user-observable information is the written word "pepper". Although those two items of information would seem to an outsider to be unrelated, the user would understand that such items of information are in fact related by virtue of the user having specified or selected them for use in the device-approval protocol, thereby creating an association between them.

As can be seen from the foregoing, any of a wide variety of user-discernable relationships may exist between the first user-observable information that is presented by first device 104 and the second user-observable information that is presented by second device 106. Accordingly, the above-provided examples are not intended to be limiting.

In the foregoing, it was stated that communication 210 includes the second user-observable information. In an alternate embodiment, communication 210 does not include the second user-observable information but instead includes an identifier thereof. In accordance with such an embodiment, second device 106 can use the identifier to identify a locally-stored version of the second user-observable information (e.g., a version of the second user-observable information that is stored in memory on second device 106), which second device 106 can then present to the user. It is possible that the identifier of the second user-observable information that is received by second device 106 can also be used by second device 106 to retrieve the second user-observable information from another source (e.g., from a remote device to which second device 106 may be communicatively connected).

In addition to presenting the second user-observable information to the user, second user-authentication based approval logic 140 may also operate to generate a response 212 to the security challenge that was received as part of communication 210 for transmission to identity provider 120. However, such response 212 to the security challenge will only be sent to identity provider 120 if the user of second device 106 authorizes such action via interaction with user interface 142. The manner in which the user of second device 106 can authorize the sending of response 212 to identity provider 120 will vary depending upon the type of security challenge that was received from identity provider 120.

For example, the security challenge may comprise a request for the user to provide one or more credentials (e.g., a user ID and password) via interaction with user interface 142. In accordance with such an embodiment, response 212 to the security challenge will only be generated and transmitted to identity provider 120 by second user-authentication-based approval logic 140 only after the user inputs the requested credentials via user interface 142.

As another example, the security challenge may comprise a type of security challenge that second user-authentication-based approval logic 140 can automatically generate a response to based on credentials that have already been stored on second device 106. In this case, second user-authentication-based approval logic 140 will request permission from the user before generating and sending response 212 to identity provider 120. For example, second user-authentication-based approval logic 140 may prompt the user for permission to send response 212 via user interface 142. If the user provides the requested permission, then response 212 will be sent to identity provider 120. However, if the user does not provide the requested permission, then response 212 will not be sent to identity provider 120.

If response 212 to the security challenge is sent to identity provider 120, then identity provider 120 will examine response 212 to determine if it comprises a valid response to the security challenge. If identity provider 120 determines that response 212 is a valid response to the security challenge, then identity provider 120 will approve first device 104. For example, identity provider 120 may approve first device 104 by sending a security token 214 to first user-authentication-based approval logic 130 of first device 104 via communication channel 110, wherein the security token indicates that a user of first device 104 has been authenticated. Security token 214 may then be used by first device 104 to obtain access to resources on behalf of the user (e.g., to access services provided by a service provider on behalf of the user).

In accordance with the foregoing description of sequence diagram 200, if second device 106 can provide a valid response to the security challenge to identity provider 120, then identity provider 120 can determine that the user of second device 106 is one for whom resources should be made accessible via first device 104. Furthermore, since the user can compare the first user-observable information presented by first device 104 to the second user-observable information presented by second device 106 and determine whether a valid relationship exists between the two, the user can control whether or not second device 106 will provide a response to the security challenge that will cause first device 104 to be approved. For example, if the user does not see that a valid relationship exists between the first user-observable information presented by first device 104 and the second user-observable information presented by second device 106, then the user may determine that some device associated with another user (e.g., a malicious user) is seeking approval to access the user's resources. In such a case, the user can decide not to provide a response to the security challenge via second device 106.

In accordance with certain embodiments, the foregoing technique enables first device 104 to be approved in a manner that does not require the user to input any information (e.g., user credentials) into first device 104. Furthermore, to implement certain embodiments, first device 104 need only include a user interface that is capable of presenting the first user-observable information. Thus, the foregoing technique provides a technical solution to the problem of obtaining user-authentication-based approval of devices that have limited display and/or user input capabilities, such as some wearable computing devices and embedded computing devices.

In accordance with further embodiments in which second device 106 is configured to act as a credential for a user such that the user doesn't have a password or other user-input-based credential, the foregoing technique also enables first device 104 to be approved by leveraging second device 106. Thus, the technique described above solves the technical problem of obtaining user-authentication-based approval of first device 104 when the user does not have a password or other user-input-based credential.

Figure 3:
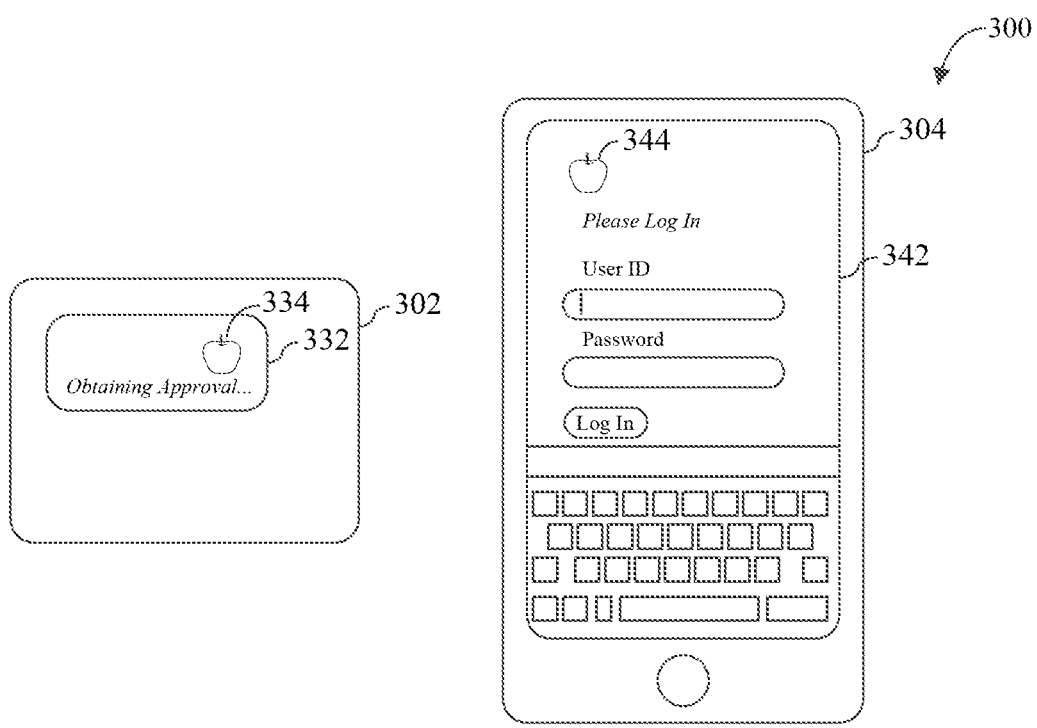
FIG. 3 depicts a first device and a second device that may be utilized to perform a technique for user-authentication-based approval of the first device in accordance with an embodiment.
Figure 4:
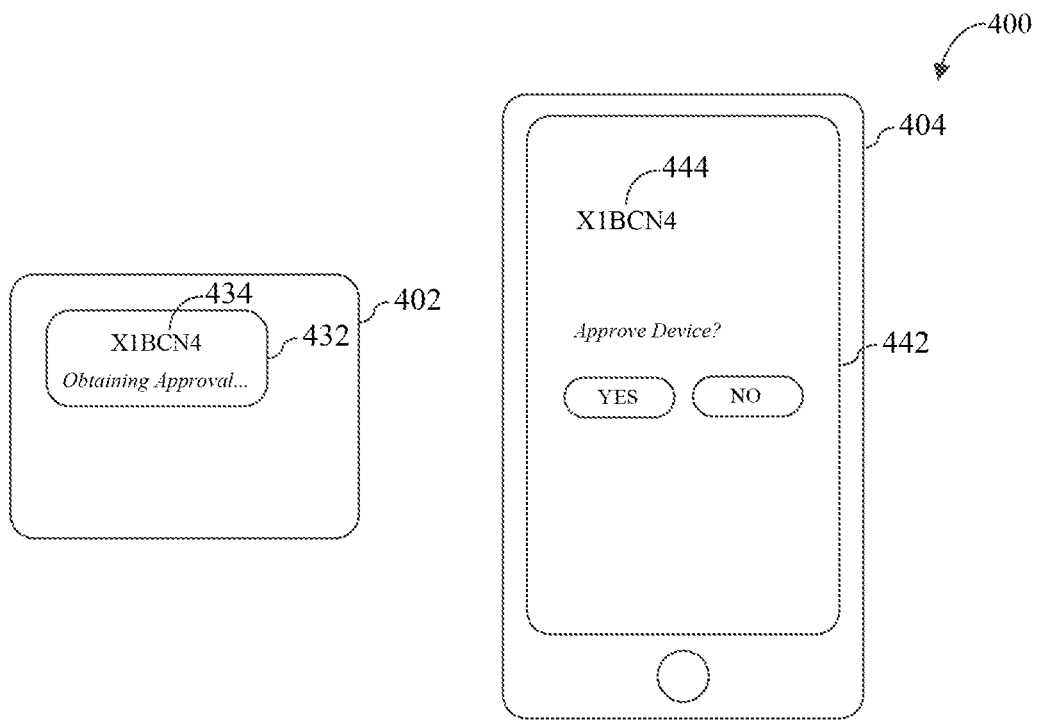
FIG. 4 depicts a first device and a second device that may be utilized to perform a technique for user-authentication-based approval of the first device in accordance with another embodiment.
Figure 5:
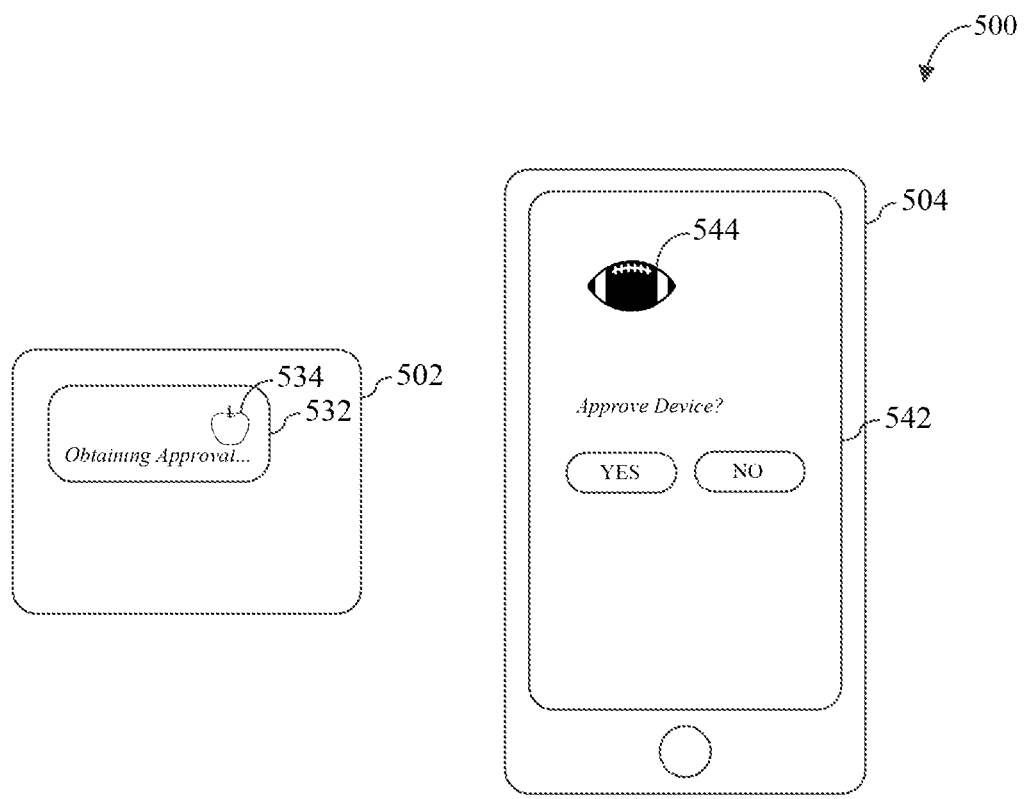
FIG. 5 depicts a first device and a second device that may be utilized to perform a technique for user-authentication-based approval of the first device in accordance with yet another embodiment.

FIGS. 3-5 depict various example embodiments of first device 102 and second device 104 of FIG. 1. These figures are described herein to help further explain the manner of operation of the components of system 100 and illustrate some benefits thereof.

For example, FIG. 3 depicts a first device 302 and a second device 304. First device 302 is an embodiment of first device 104 of FIG. 1 and second device 304 is an embodiment of second device 106 of FIG. 1. First device 302 may represent, for example, a thermostat with limited display and user input capabilities, while second device 304 may represent, for example, a smart phone with comparatively superior display and user input capabilities.

As shown in FIG. 3, first device 302 has obtained first user-observable-information 334, which is an image of an apple, from an identity provider and rendered it to a display 332 of first device 302. First device 302 also receives a session ID from the identity provider and sends it to second device 304 via a communication channel (e.g., an insecure communication channel). Second device 304 uses the session ID to obtain second user-observable information 344, which is an image of an apple, and a security challenge from the identity provider. Second device 304 displays the second user-observable information 344 in a display 342 of second device 304 as well as a GUI by which a user can enter user credentials in the form of a User ID and Password and then submit such credentials by interacting with a "Log In" button. The submitted credentials can be used by second device 304 to respond to the security challenge.

Since the user of first device 302 and second device 304 can see that both devices are displaying the same user-observable-information (i.e., the same image of an apple), the user can feel comfortable submitting his or credentials via second device 304, since the display of the identical images indicates to the user that the credentials provided thereby will be used to approve first device 302 and not some other device (e.g., a device owned by some other user). Furthermore, since the user can enter his or her credentials via the GUI provided by device 304, the user need not try to provide such credentials via device 302, which has a more limited user interface.

As another example, FIG. 4 depicts a first device 402 and a second device 404. First device 402 is another thermostat embodiment of first device 104 of FIG. 1 and second device 404 is another smart phone embodiment of second device 106 of FIG. 1.

As shown in FIG. 4, first device 402 has obtained first user-observable-information 434, which is the alphanumeric code X1BCN4, from an identity provider and rendered it to a display 432 of first device 402. First device 402 also receives a session ID from the identity provider and sends it to second device 404 via a communication channel (e.g., an insecure communication channel). Second device 404 uses the session ID to obtain second user-observable information 444, which is the alphanumeric code X1BCN4, and a security challenge from the identity provider. Second device 304 displays the second user-observable information 444 in a display 442 of second device 404. In this embodiment, second device 404 already stores one or more credentials and thus can automatically generate its own response to the security challenge. Consequently, second device 404 need only prompt the user via user interface 442 to see if the user wants to approve first device 402. If the user responds "yes" (e.g., by interacting with the "YES" button"), then second device 404 will generate and transmit a response to the security challenge to the identity provider. However, if the user responds "no" (e.g., by interacting with the "NO" button), then second device 404 will not respond to the security challenge.

Since the user of first device 402 and second device 404 can see that both devices are displaying the same user-observable-information (i.e., the same alphanumeric code X1BCN4), the user can feel comfortable indicating that first device 402 should be approved, since the display of the identical alphanumeric codes indicates to the user that the response to the security challenge provided by second device 404 will be used to approve first device 402 and not some other device (e.g., a device owned by some other user).

As another example, FIG. 5 depicts a first device 502 and a second device 504. First device 502 is another thermostat embodiment of first device 104 of FIG. 1 and second device 504 is another smart phone embodiment of second device 106 of FIG. 1.

As shown in FIG. 5, first device 502 is displaying first user-observable information 534 via a display 532, wherein first user-observable information 534 is an image of an apple. Second device 504 is displaying second user-observable information 544 via a display 542, wherein second user-observable-information 544 is an image of a football. Second device 504 is also prompting the user via display 542 to approve another device. In this scenario, since the user can see that the devices are displaying user-observable information for which there is no discernable relationship (i.e., the image of the apple bears no discernable relationship to the image of the football), the user can decide not to approve the other device by interacting with the "NO" button on display 542. The display of the unrelated images indicates to the user that the response to the security challenge provided by second device 504 will be used to approve some device other than first device 502 (e.g., a device owned by some other user).

A method by which a first device, such as any of first device 104, first device 302, first device 402, or first device 502, may operate in conjunction with a second device and an identity provider to obtain user-authentication-based approval from the identity provider will now be described in reference to flowchart 600 of FIG. 6. However, the method of flowchart 600 is not limited to these embodiments.

Figure 6:
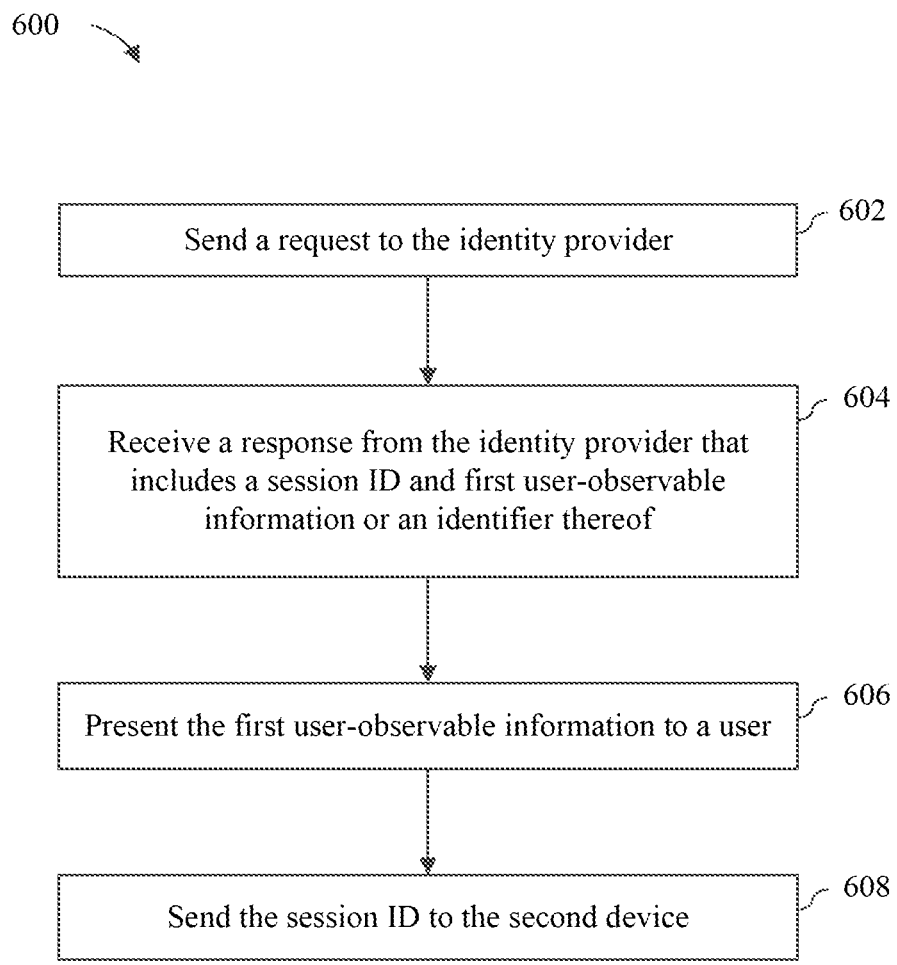
FIG. 6 depicts a flowchart of a method that may be performed by a first device, operating in conjunction with a second device and an identity provider, to obtain user-authentication-based approval thereof in accordance with an embodiment.

As shown in FIG. 6, the method of flowchart 600 begins at step 602 in which the first device sends a request to the identity provider.

At step 604, the first device receives a response from the identity provider that includes a session ID and first-user observable information or an identifier thereof.

At step 606, the first device presents the first user-observable information to a user.

At step 608, the first device sends the session ID to the second device. The first device may send the session ID to the second device, for example, over an insecure channel.

The session ID may be useable by the second device to obtain second user-observable information, or an identifier thereof, and a security challenge from the identity provider. The second user-observable information may bear a user-discernable relationship to the first user-observable information. The second device may be operable to present the second user-observable information to the user and to generate a response to the security challenge for transmission to the identity provider based at least on input received from the user via a user interface of the second device. The response to the security challenge may be indicative of the suitability of the first device for user-authentication-based approval by the identity provider.

A method by which a second device, such as any of second device 106, second device 304, second device 404, or second device 504, may operate in conjunction with a first device and an identity provider to obtain user-authentication-based approval from the identity provider for the first device will now be described in reference to flowchart 700 of FIG. 7. However, the method of flowchart 700 is not limited to these embodiments.

Figure 7:
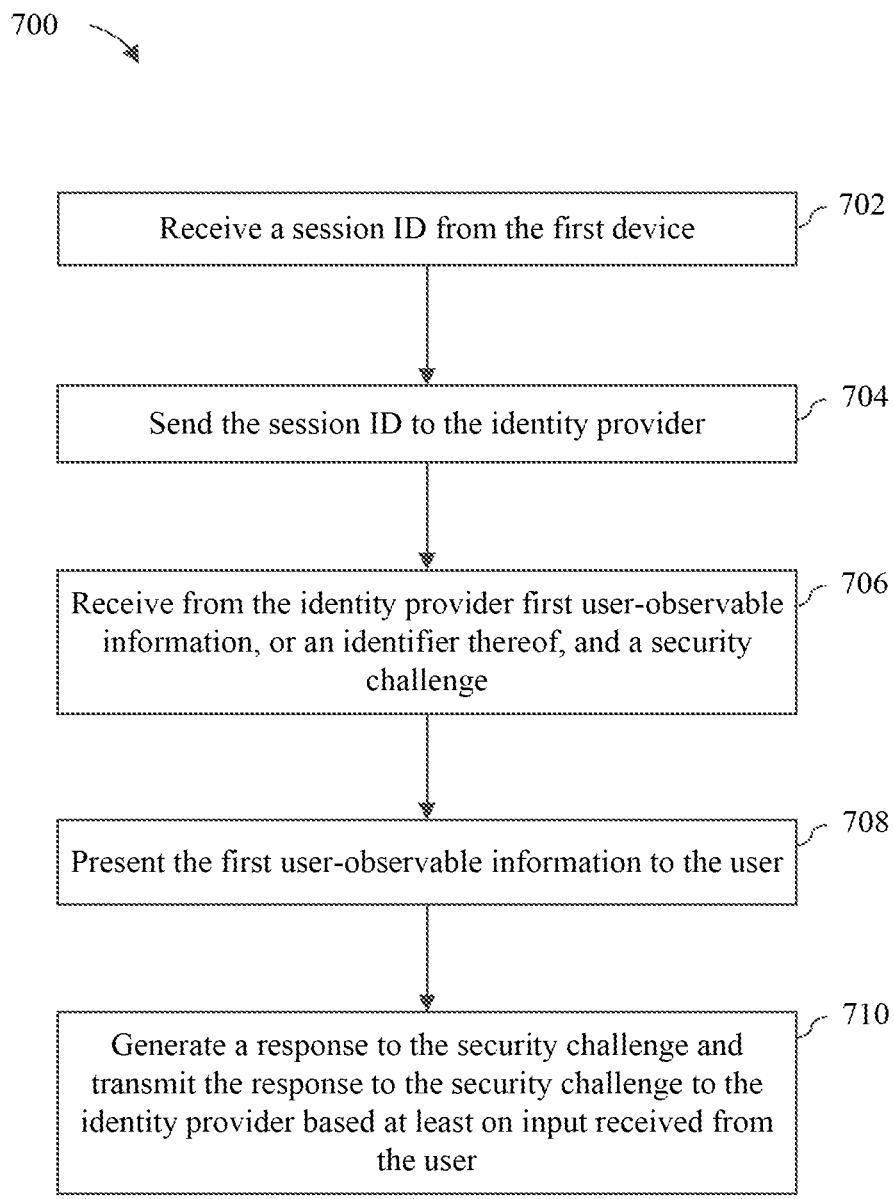
FIG. 7 depicts a flowchart of a method that may be performed by a second device, operating in conjunction with a first device and an identity provider, to obtain user-authentication-based approval for the first device in accordance with an embodiment.

As shown in FIG. 7, the method of flowchart 700 begins at step 702 in which the second device receives a session ID from a first device. The session ID may be received, for example, over an insecure channel.

At step 704, the second device sends the session ID to the identity provider.

At step 706, the second device receives from the identity provider first user-observable information, or an identifier thereof, and a security challenge. The first user-observable information bears a user-discernable relationship to second user-observable information that was presented to a user by the first device.

At step 708, the second device presents the first user-observable information to the user.

At step 710, the second device generates a response to the security challenge and transmits the response to the security challenge to the identity provider based at least on input received from the user. In an embodiment, the second device generates the response to the security challenge based at least on a password input by the user via a user interface of the second device. In another embodiment, the second device generates the response to the security challenge automatically in response to receiving an indication from the user via a user interface of the second device that the first device is to be approved.

A method by which an identity provider, such as identity provider 120, may operate in conjunction with a first device and a second device to obtain user-authentication-based approval for the first device will now be described in reference to flowchart 800 of FIG. 8. However, the method of flowchart 800 is not limited to these embodiments.

Figure 8:
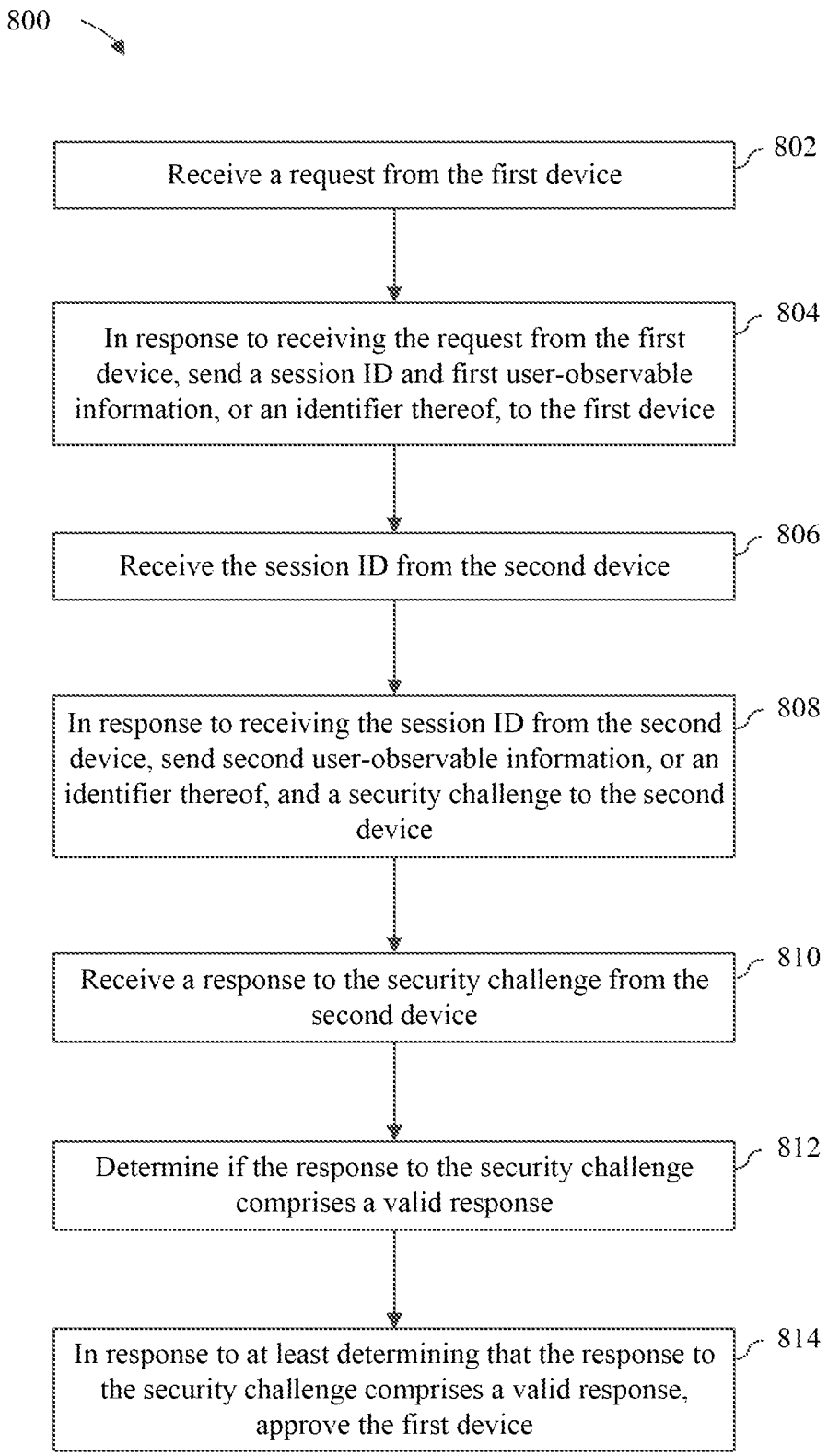
FIG. 8 depicts a flowchart of a method that may be performed by an identity provider, operating in conjunction with a first device and a second device, to obtain user-authentication-based approval for the first device in accordance with an embodiment.

As shown in FIG. 8, the method of flowchart 800 begins at step 802, in which the identity provider receives a request from the first device.

At step 804, in response to receiving the request from the first device, the identity provider sends a session ID and first user-observable information, or an identifier thereof, to the first device. The first user-observable information is suitable for presentation to a user by the first device.

At step 806, the identity provider receives the session ID from the second device.

At step 808, in response to receiving the session ID from the second device, the identity provider sends second user-observable information, or an identifier thereof, and a security challenge to the second device. The second user-observable information bears a user-discernable relationship to the first user-observable information and is suitable for presentation to the user by the second device.

At step 810, the identity provider receives a response to the security challenge from the second device.

At step 812, the identity provider determines if the response to the security challenge comprises a valid response.

At step 814, in response to at least determining that the response to the security challenge comprises a valid response, the identity provider approves the first device. The approval of the first device may entail, for example, sending a security token to the first device that can be used by the first device to access resources on behalf of the user. Although not shown in flowchart 800, the identity provider may determine that no response has been provided to the security challenge or that an invalid response has been provided to the security challenge. In these cases, the identity provider will not approve the first device.

III. Example Mobile Device Implementation

Figure 9:
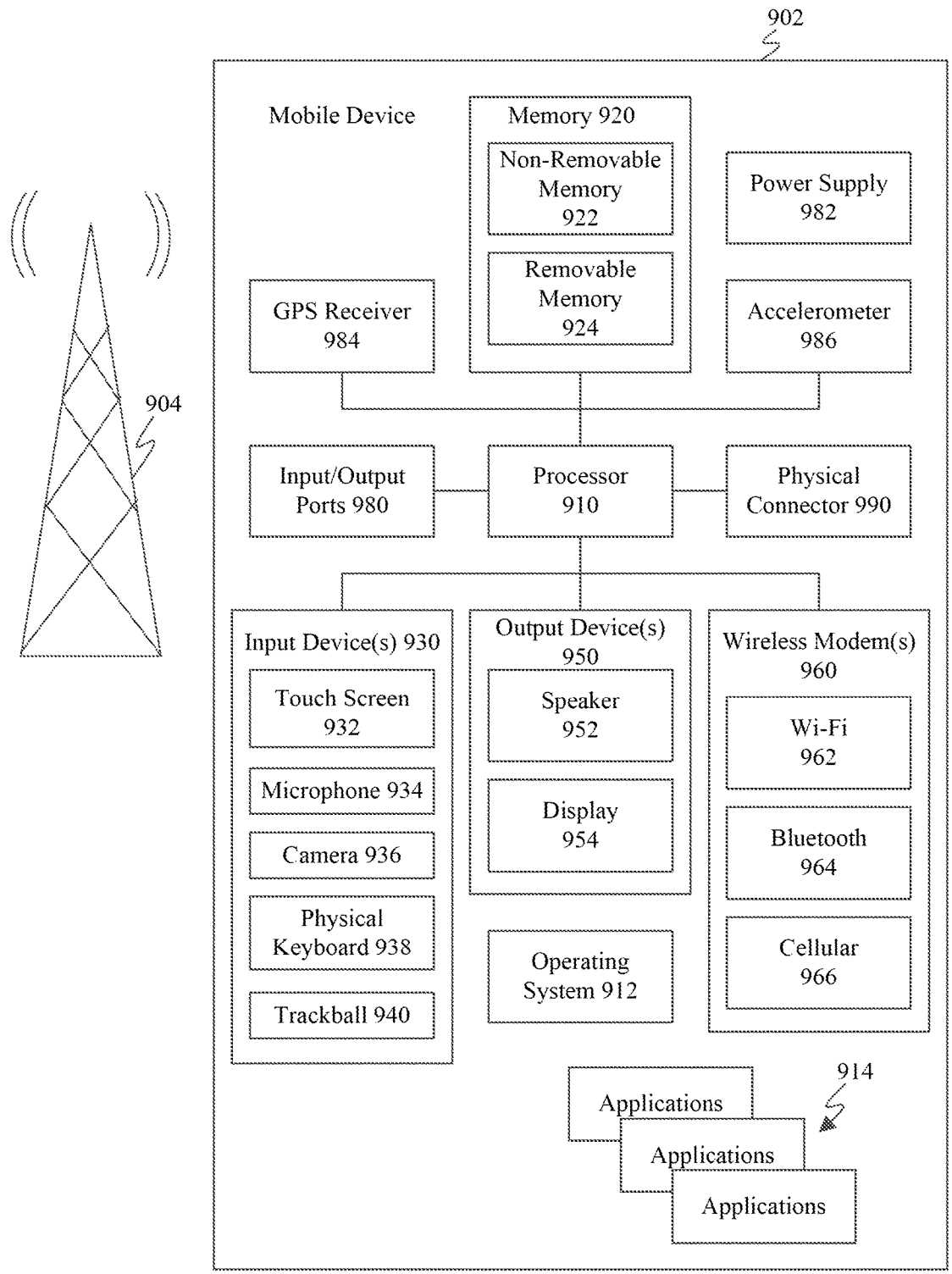
FIG. 9 is a block diagram of an example mobile device that may be used to implement various embodiments.

FIG. 9 is a block diagram of an exemplary mobile device 902 that may implement embodiments described herein. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smartphone, handheld computer, Personal Digital Assistant (PDA), etc.) and can allow wireless two-way communications with one or more mobile communications networks 904, such as a cellular or satellite network, or with a local area or wide area network.

The illustrated mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, Web browsers, messaging applications) and any other computing applications (e.g., word processing applications, mapping applications, media player applications).

The illustrated mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and applications 914. Example data can include Web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Touch screens, such as touch screen 932, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 932 and display 954 can be combined in a single input/output device. The input devices 930 can include a Natural User Interface (NUI).

Wireless modem(s) 960 can be coupled to antenna(s) (not shown) and can support two-way communications between the processor 910 and external devices, as is well understood in the art. The modem(s) 960 are shown generically and can include a cellular modem 966 for communicating with the mobile communication network 904 and/or other radio-based modems (e.g., Bluetooth 964 and/or Wi-Fi 962). At least one of the wireless modem(s) 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by persons skilled in the relevant art(s).

In an embodiment, mobile device 902 is configured to perform any of the functions of first device 104 or second device 106 as described above in reference to FIG. 1, first device 302 or second device 304 as described above in reference to FIG. 3, first device 402 or second device 404 as described above in reference to FIG. 4, or first device 502 or second device 504 as described above in reference to FIG. 5. Computer program logic for performing the functions of these devices may be stored in memory 920 and executed by processor 910. By executing such computer program logic, processor 910 may be caused to implement any of the features of any of these devices. Also, by executing such computer program logic, processor 910 may be caused to perform any or all of the steps of any or all of the flowcharts depicted in FIG. 6 or 7.

IV. Example Computer System Implementation

Figure 10:
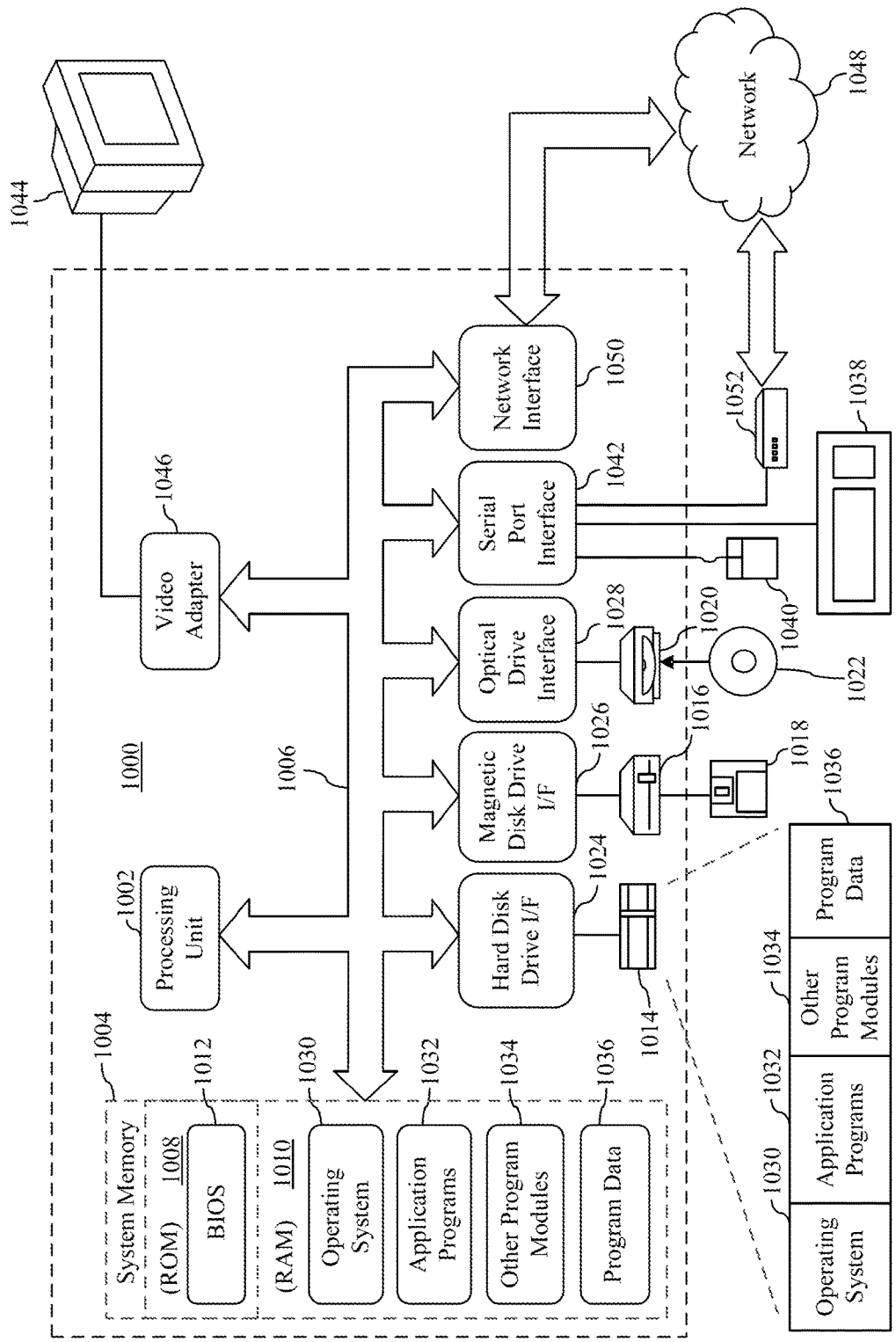
FIG. 10 is a block diagram of an example processor-based computer system that may be used to implement various embodiments.

FIG. 10 depicts an example processor-based computer system 1000 that may be used to implement various embodiments described herein. For example, system 1000 may be used to implement any of server 102, first device 104 or second device 106 as described above in reference to FIG. 1, first device 302 or second device 304 as described above in reference to FIG. 3, first device 402 or second device 404 as described above in reference to FIG. 4, or first device 502 or second device 504 as described above in reference to FIG. 5. System 1000 may also be used to implement any or all of the steps of any or all of the flowcharts depicted in FIGS. 6-8. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more microprocessors or microprocessor cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of server 102, first device 104 or second device 106 as described above in reference to FIG. 1, first device 302 or second device 304 as described above in reference to FIG. 3, first device 402 or second device 404 as described above in reference to FIG. 4, or first device 502 or second device 504 as described above in reference to FIG. 5. The program modules may also include computer program logic that, when executed by processing unit 1002, performs any of the steps or operations shown or described in reference to the flowcharts of FIGS. 6-8.

A user may enter commands and information into system 1000 through input devices such as a keyboard 1038 and a pointing device 1040. Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB). Such interfaces may be wired or wireless interfaces.

A display 1044 is also connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface or adapter 1050, a modem 1052, or other suitable means for establishing communications over the network. Modem 1052, which may be internal or external, is connected to bus 1006 via serial port interface 1042.

As used herein, the terms "computer program medium," "computer-readable medium," and "computer-readable storage medium" are used to generally refer to memory devices or storage structures such as the hard disk associated with hard disk drive 1014, removable magnetic disk 1018, removable optical disk 1022, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable system 1000 to implement features of embodiments of the present invention discussed herein. Accordingly, such computer programs represent controllers of the system 1000.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1000 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Additional Exemplary Embodiments

A device is described herein. The device includes a user interface and user-authentication-based approval logic. The user interface is operable to present information to a user and to receive input therefrom. The user-authentication-based approval logic is operable to receive a session ID from another device over an insecure channel and to perform the following in response to at least receiving the session ID from the other device: send the session ID to an identity provider; receive from the identity provider first user-observable information, or an identifier thereof, and a security challenge, the first user-observable information bearing a user-discernable relationship to second user-observable information presented to a user by the other device; present the first user-observable information to the user via the user interface; and generate a response to the security challenge and transmit the response to the security challenge to the identity provider based at least on input received from the user via the user interface, the response to the security challenge being indicative of the suitability of the other device for user-authentication-based approval by the identity provider.

In an embodiment of the foregoing device, the user-authentication-based approval logic is operable to receive the session ID from the other device over one of: a local area network; an IEEE 802.11 network; a BLUETOOTH® piconet; and a Near Field Communication session.

In another embodiment of the foregoing device, the session ID comprises a cryptographically secure random number or a cryptographically secure pseudorandom number.

In yet another embodiment of the foregoing device, the first user-observable information is identical to the second user-observable information.

In still another embodiment of the foregoing device, one or more of the first user-observable information and the second user-observable information comprises information that is suitable for presentation to the user in at least one of: a viewable form; an audible form; and a touch-sensible form.

In a further embodiment of the foregoing device, one or more of the first user-observable information and the second user-observable information represents an image; a word; or an alphanumeric code.

In a still further embodiment of the foregoing device, the user-authentication-based approval logic is operable to generate the response to the security challenge based at least on a password input by the user via the user interface.

In another embodiment of the foregoing device, the user-authentication-based approval logic is operable to automatically generate the response to the security challenge in response to receiving an indication from the user via the user interface that the other device is to be approved.

In yet another embodiment of the foregoing device, the other device is one of a wearable computing device; or an embedded computing device.

A computer program product is also described herein. The computer program product comprises a computer-readable memory having computer program logic recorded thereon that when executed by at least one processor causes the at least one processor to perform a method for obtaining user-authentication-based approval of a first device. The method comprises: sending a request to an identity provider; receiving a response from the identity provider that includes a session ID and first user-observable information, or an identifier thereof; presenting the first user-observable information to a user; and sending the session ID to a second device over an insecure channel, the session ID being useable by the second device to obtain second user-observable information, or an identifier thereof, and a security challenge from the identity provider, the second user-observable information bearing a user-discernable relationship to the first user-observable information, the second device being operable to present the second user-observable information to the user and to generate a response to the security challenge for transmission to the identity provider based at least on input received from the user via a user interface of the second device, the response to the security challenge being indicative of the suitability of the first device for user-authentication-based approval by the identity provider.

In one embodiment of the foregoing computer program product, the insecure channel comprises one of: a local area network; an IEEE 802.11 network; a BLUETOOTH® piconet; and a Near Field Communication session.

In another embodiment of the foregoing computer program product, the first user-observable information is identical to the second user-observable information.

In yet another embodiment of the foregoing computer program product, one or more of the first user-observable information and the second user-observable information comprises information that is suitable for presentation to the user in at least one of: a viewable form; an audible form; and a touch-sensible form.

A method for approving a first device by an identity provider based on user authentication, the identity provider being implemented on one or more computers, is also described herein. The method comprises: receiving a request from the first device; in response to receiving the request from the first device, sending a session ID and first user-observable information, or an identifier thereof, to the first device, the first user-observable information being suitable for presentation to a user by the first device; receiving the session ID from a second device; in response to receiving the session ID from the second device, sending second user-observable information, or an identifier thereof, and a security challenge to the second device, the second user-observable information bearing a user-discernable relationship to the first user-observable information and being suitable for presentation to the user by the second device; receiving a response to the security challenge from the second device; determining if the response to the security challenge comprises a valid response; and in response to at least determining that the response to the security challenge comprises a valid response, approving the first device.

In one embodiment of the foregoing method, the session ID comprises a cryptographically secure random number or a cryptographically secure pseudorandom number and the method further comprises: generating the cryptographically secure random number or the cryptographically secure pseudorandom number.

In another embodiment of the foregoing method, the first user-observable information is identical to the second user-observable information.

In yet another embodiment of the foregoing method, one or more of the first user-observable information and the second user-observable information comprises information that is suitable for presentation to the user in at least one of: a viewable form; an audible form; and a touch-sensible form.

In still another embodiment of the foregoing method, one or more of the first user-observable information and the second user-observable information represents: an image; a word; or an alphanumeric code.

In a further embodiment of the foregoing method, sending the security challenge to the second device comprises: sending a request for at least a password to the second device.

In a still further embodiment of the foregoing method, communications with the first and second devices are carried out over secure channels.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A device, comprising:
    processing circuitry configured to execute:
        a user interface operable to present information to a user and to receive input therefrom; and
        user-authentication-based approval logic operable to receive a session identifier (ID) from another device that transmits the session ID over a wireless channel and to perform the following in response to at least receiving the session ID from the other device:
            send the session ID to an identity provider;
            receive from the identity provider first user-observable information, or an identifier thereof, and a security challenge after sending the session ID thereto, the first user-observable information bearing a user-discernable relationship to second user-observable information that is received by the other device from the identity provider and presented to the user by the other device prior to the user-authorization-based approval logic receiving a response to the security challenge;
            present the first user-observable information to the user via the user interface prior to receiving a response to the security challenge; and
            receive a response to the security challenge and transmit the response to the security challenge to the identity provider based at least on input received from the user via the user interface, the response to the security challenge being indicative of the suitability of the other device for user-authentication-based approval by the identity provider.

2. The device of claim 1, wherein the user-authentication-based approval logic is operable to receive the session ID from the other device over one of:
    a local area network;
    an IEEE 802.11 network;
    a BLUETOOTH® piconet; and
    a Near Field Communication session.

3. The device of claim 1, wherein the session ID comprises a cryptographically secure random number or a cryptographically secure pseudorandom number.

4. The device of claim 1, wherein the first user-observable information is identical to the second user-observable information.

5. The device of claim 1, wherein one or more of the first user-observable information and the second user-observable information comprises information that is suitable for presentation to the user in at least one of:
- a viewable form;
- an audible form; and
- a touch-sensible form.

6. The device of claim 1, wherein one or more of the first user-observable information and the second user-observable information represents:
- an image;
- a word; or
- an alphanumeric code.

7. The device of claim 1, wherein the user-authentication-based approval logic is operable to receive the response to the security challenge by receiving at least on a password input by the user via the user interface.

8. The device of claim 1, wherein the user-authentication-based approval logic is operable to automatically generate the response to the security challenge in response to receiving an indication from the user via the user interface that the other device is to be approved.

9. The device of claim 1, wherein the other device is one of:
- a wearable computing device; or
- an embedded computing device.

10. A computer program product comprising a computer-readable memory having computer program logic recorded thereon that when executed by at least one processor of a first device causes the at least one processor to perform a method for obtaining user-authentication-based approval of the first device, the method comprising:
  sending a request to an identity provider;
  receiving a response from the identity provider that includes a session identifier (ID) and first user-observable information, or an identifier thereof;
  presenting the first user-observable information to a user prior to a second device receiving a response to a security challenge; and
  sending the session ID to the second device over a wireless channel, the session ID being useable by the second device to obtain second user-observable information, or an identifier thereof, and the security challenge from the identity provider, the second user-observable information bearing a user-discernable relationship to the first user-observable information, the second device being operable to present the second user-observable information to the user prior to receiving a response to the security challenge and to receive a response to the security challenge for transmission to the identity provider based at least on input received from the user via a user interface of the second device, the response to the security challenge being indicative of the suitability of the first device for user-authentication-based approval by the identity provider.

11. The computer program product of claim 10, wherein the wireless channel comprises one of:
- a local area network;
- an IEEE 802.11 network;
- a BLUETOOTH® piconet; and
- a Near Field Communication session.

12. The computer program product of claim 10, wherein the first user-observable information is identical to the second user-observable information.

13. The computer program product of claim 10, wherein one or more of the first user-observable information and the second user-observable information comprises information that is suitable for presentation to the user in at least one of:
- a viewable form;
- an audible form; and
- a touch-sensible form.

14. A method for approving a first device by an identity provider based on user authentication, the identity provider being implemented on one or more computers, the method comprising:
  receiving a request from the first device;
  in response to receiving the request from the first device, sending a session identifier (ID) and first user-observable information, or an identifier thereof, to the first device, the first user-observable information being suitable for presentation to a user by the first device prior to a second device receiving a response to a security challenge;
  receiving the session ID from the second device;
  in response to receiving the session ID from the second device, sending second user-observable information, or an identifier thereof, and the security challenge to the second device, the second user-observable information bearing a user-discernable relationship to the first user-observable information and being suitable for presentation to the user by the second device prior to receiving a response to a security challenge;
  receiving a response to the security challenge from the second device;
  determining if the response to the security challenge comprises a valid response; and
  in response to at least determining that the response to the security challenge comprises a valid response, approving the first device.

15. The method of claim 14, wherein the session ID comprises a cryptographically secure random number or a cryptographically secure pseudorandom number and wherein the method further comprises:
  generating the cryptographically secure random number or the cryptographically secure pseudorandom number.

16. The method of claim 14, wherein the user-discernable relationship between the first user-observable information and the second user-observable information exists by virtue of the user creating an association between the first user-observable information and the second user-observable information.

17. The method of claim 14, wherein one or more of the first user-observable information and the second user-observable information comprises information that is suitable for presentation to the user in at least one of:
- a viewable form;
- an audible form; and
- a touch-sensible form.

18. The method of claim 14, wherein one or more of the first user-observable information and the second user-observable information represents:
- an image;
- a word; or
- an alphanumeric code.

19. The method of claim 14, wherein sending the security challenge to the second device comprises:
  sending a request for at least a password to the second device.

20. The method of claim 14, wherein communications with the first and second devices are carried out over secure channels.

* * * * *